Aug. 20, 1940.  M. C. TATE  2,212,085
LOAD INDICATING AND CONTROLLING APPARATUS FOR TESTING MACHINES
Filed Jan. 27, 1936  6 Sheets-Sheet 1

INVENTOR
M. C. Tate
BY
ATTORNEY

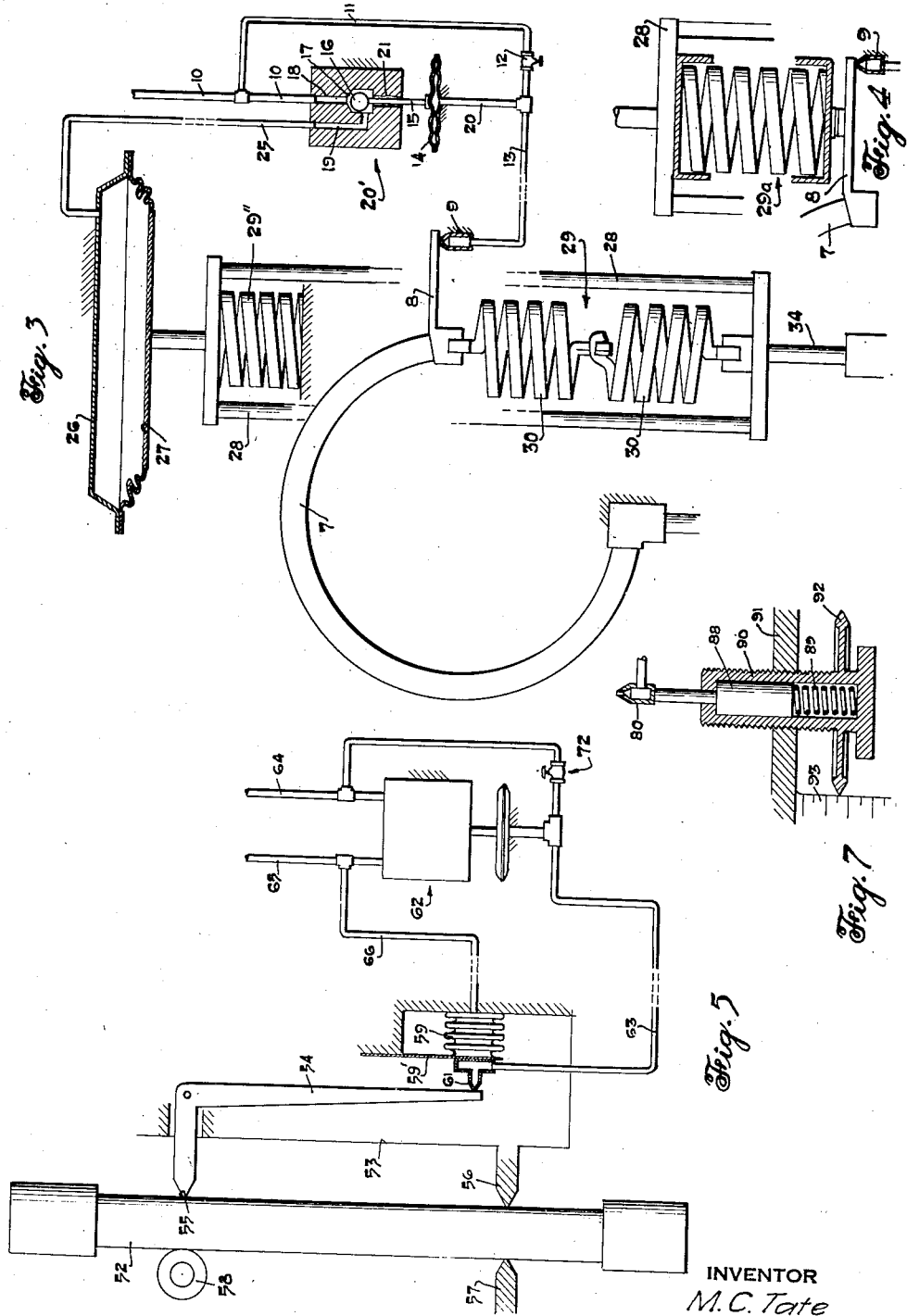

Aug. 20, 1940.                M. C. TATE                   2,212,085
        LOAD INDICATING AND CONTROLLING APPARATUS FOR TESTING MACHINES
                         Filed Jan. 27, 1936            6 Sheets-Sheet 4

INVENTOR
M. C. Tate
BY
ATTORNEY

Aug. 20, 1940.  M. C. TATE  2,212,085
LOAD INDICATING AND CONTROLLING APPARATUS FOR TESTING MACHINES
Filed Jan. 27, 1936  6 Sheets-Sheet 5
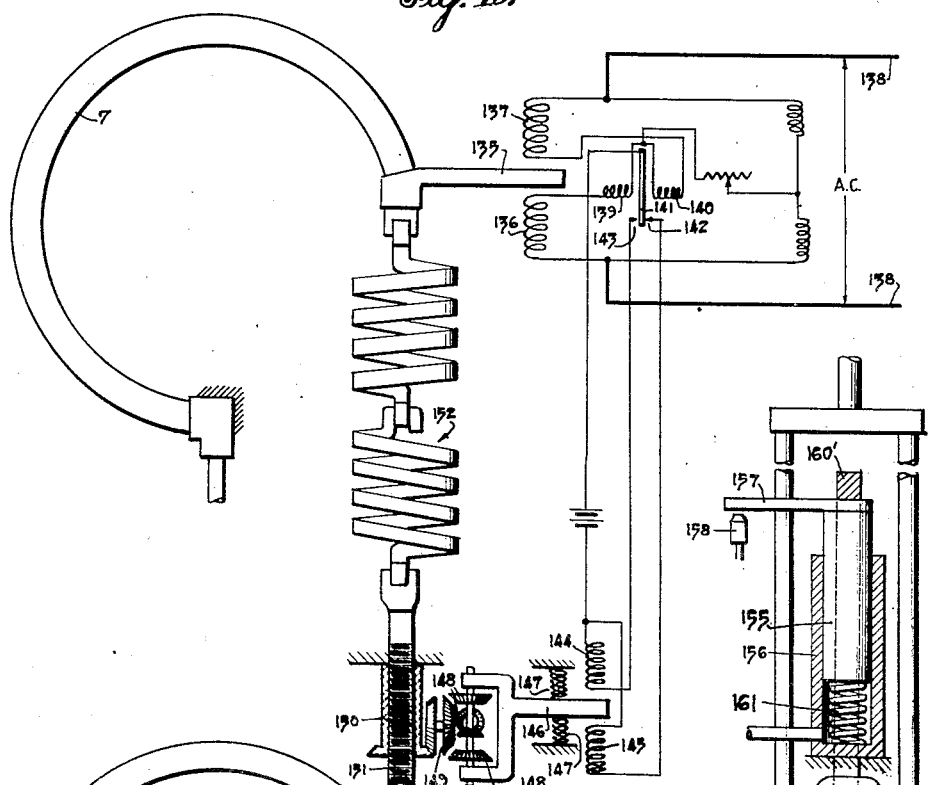
Fig. 10.
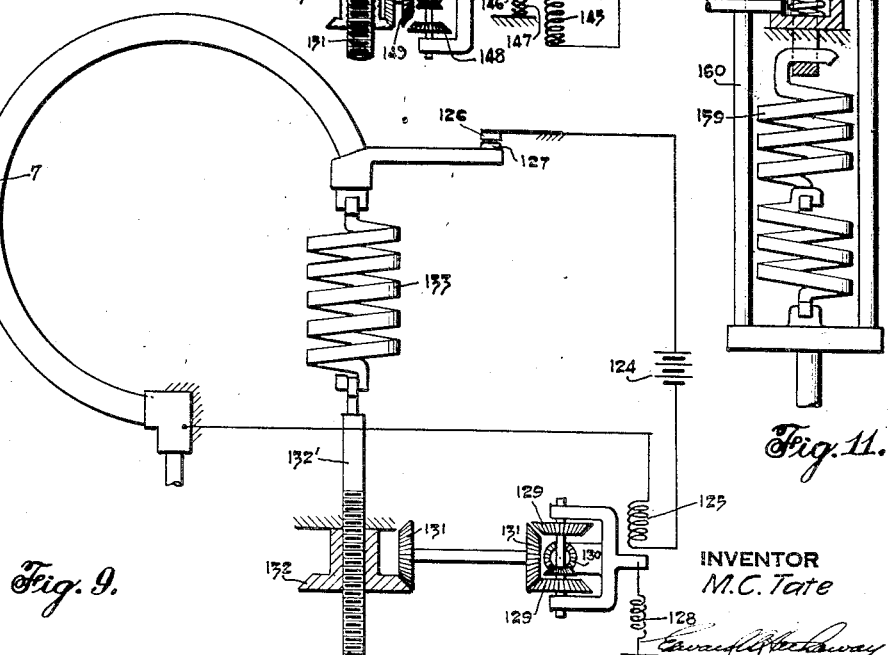
Fig. 11.
Fig. 9.
INVENTOR
M.C. Tate
ATTORNEY Aug. 20, 1940.    M. C. TATE    2,212,085
LOAD INDICATING AND CONTROLLING APPARATUS FOR TESTING MACHINES
Filed Jan. 27, 1936    6 Sheets-Sheet 6

INVENTOR
M. C. Tate
BY
ATTORNEY

Patented Aug. 20, 1940

2,212,085

UNITED STATES PATENT OFFICE 2,212,085

LOAD INDICATING AND CONTROLLING APPARATUS FOR TESTING MACHINES

Malcolm C. Tate, Stamford, Conn., assignor, by mesne assignments, to The Baldwin Locomotive Works, a corporation of Pennsylvania Application January 27, 1936, Serial No. 61,029

33 Claims. (Cl. 265—2)

This invention relates generally to an improved apparatus for converting increments of fluid pressure into corresponding increments of motion and vice versa.

While apparatus of the type herein disclosed may have various fields of application, yet it is especially applicable to the field of materials testing machines wherein it is desirable to study the stress and strain characteristics of a specimen. A load indicating apparatus, e. g., of a testing machine, is usually employed either to indicate, as by a dial and hand, the load usually imposed upon the specimen or to record the load in combination with strain. When applied to hydraulic machines, such apparatus usually employs Bourdon tubes as the load responsive element arranged to directly operate a hand or pointer or to control an external source of power for operating the recorder to indicate the load component. The Bourdon tubes in such equipment have heretofore operated in their well known manner of freely expanding and contracting, the free end moving in accordance with changes of pressure in the tube. As is also well known, Bourdon tubes converting pressure energy into mechanical energy are very sensitive to friction or external forces and hence great care has heretofore been required in their use and fields of application. Another difficulty has been that the motion transmitted from the end of the tube by the linkage, rack and pinion does not necessarily maintain a straight line relation between the pressure increments and the increments of movement. Hence it has been of the utmost importance to properly calibrate any apparatus employing Bourdon tubes if any degree of real accuracy is desired, as is required in the materials testing field.

It is an object of my invention to provide improved apparatus for converting increments of fluid pressure into corresponding increments of motion or vice versa and to do this in a manner that is relatively inexpensive, that is free from friction at vital points of the apparatus and will permit an external source of operating power to be employed to operate a desired element in a most effective manner and with a very high degree of accuracy and sensitivity together with smoothness of operation. While a Bourdon tube has been found to be peculiarly adapted as an element of my invention, yet other pressure responsive apparatus such as a diaphragm pressure chamber, a bellows, a lapped ram and cylinder or helical or spiral sealed tubes, may be broadly used in place of the Bourdon tube under certain circumstances.

In one aspect of the invention I have accomplished the foregoing objects and improved results, as well as possible others, by having control means arranged to be responsive to minute movements of the free end of a Bourdon tube away from an initial or normal position thereof and then employing means controlled by said responsive means for effecting restoration of said free end to said initial position, this restoring means broadly functioning either to vary an external force on the free end of the tube without changing the internal pressure thereof, or to vary the internal pressure of the tube without changing the external force thereon. By having the responsive control means in the form of an air relay whose jet is controlled by a simple baffle formed on the free end of the tube, then I can completely eliminate friction and drag at a vital point in the apparatus and thus obtain a very high degree of accuracy, sensitivity and smoothness of operation in cooperation with the restoring means.

Further objects are to provide improved strain responsive and indicating apparatus as well as load maintaining apparatus, all so constructed and arranged as to employ the air relay principle in a manner that will insure the same sensitivity, accuracy and smoothness of operation above referred to.

Other objects and advantages will be more apparent to those skilled in the art from the following description of the accompanying drawings in which:

Fig. 3 is an enlarged diagrammatic illustration of the load responsive apparatus embodied in Fig. 1;

Fig. 4 is a modified arrangement of Fig. 3 showing a compression spring in the place of the tension spring for controlling the free end of the tube;

Fig. 5 is an enlarged diagrammatic illustration of a strain responsive apparatus embodied in Fig. 1;

Fig. 7 is an enlarged vertical central view of the means for adjusting the load maintainer to any predetermined load value;

Figs. 9 and 10 are modified control elements adapted to cooperate with the free end of the Bourdon tube when my invention is incorporated therewith;

Fig. 11 is a ram and cylinder used as a pressure responsive means;

Figures 1, 2:
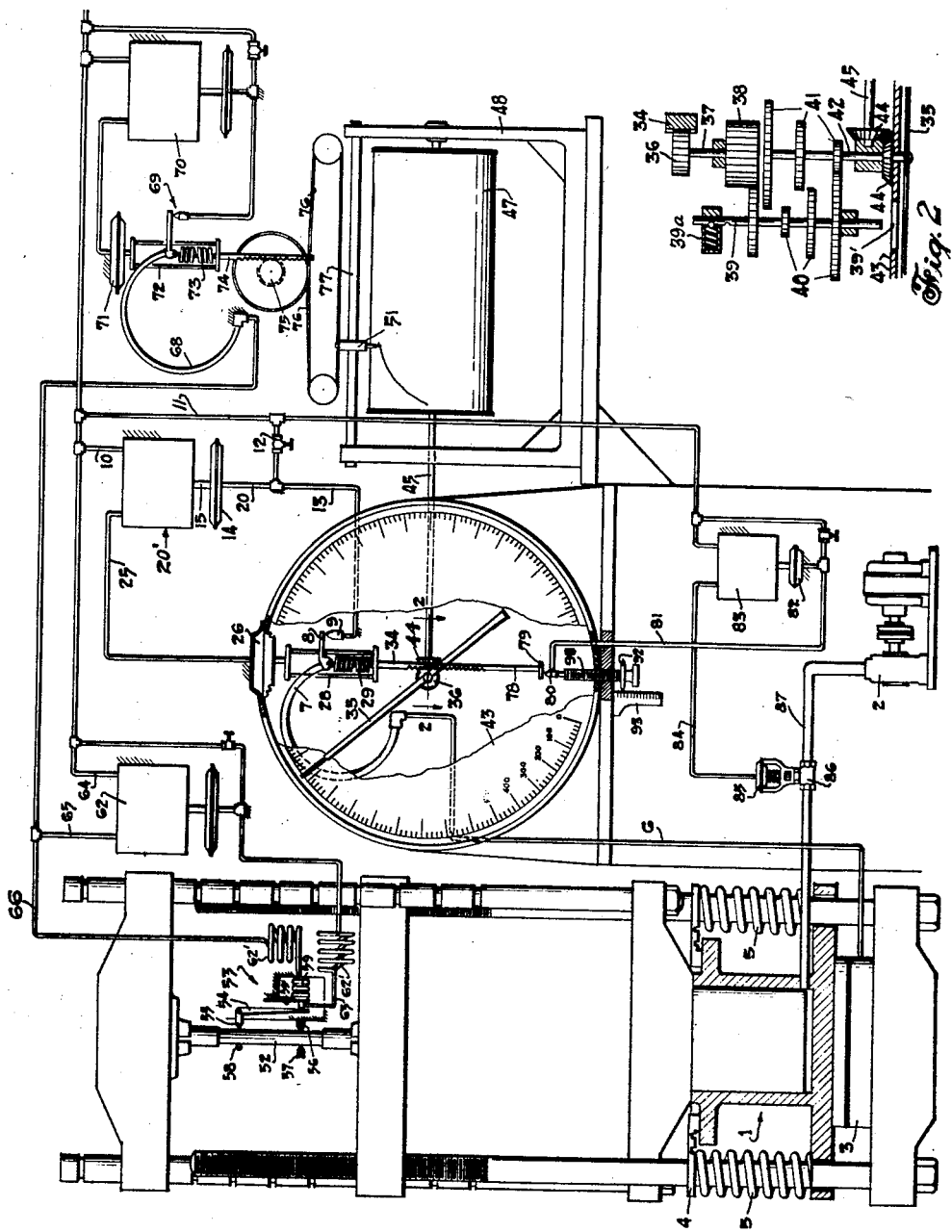
Fig. 1 is a diagrammatic illustration of my invention applied to a materials testing machine.
Fig. 2 is an enlarged horizontal section of a mechanism for effecting different load ranges, taken on line 2—2 of Fig. 1.

In the particular embodiments of the invention, such as are disclosed herein merely for the purpose of illustrating certain specific forms among possible others that the invention might take in practice, I have diagrammatically shown the invention applied preferably to materials testing apparatus. While various types of materials testing machines having either hydraulic load producing mechanism or hydraulic load weighing systems may be used, yet for purposes of illustration I have shown my invention specifically in connection with an Emery type machine having a load producing ram and cylinder 1 supplied with operating fluid from any suitable source such as a motor driven pump 2. A hydraulic support 3, one specific form of which is shown in Emery Patent No. 1,848,468, may be arranged in any suitable manner to permit tension or compression load on a specimen to be transmitted to the hydraulic support, for example, through a suitably supported sensitive frame 4. The liquid in the support is preloaded by initial load springs 5 arranged as shown in said Emery patent to urge the sensitive frame upwardly and thereby impose an initial load on the hydraulic support. The preloaded liquid is transmitted from the support through a tube 6 to a Bourdon tube 7 which controls the application of an external source of power for operating a load indicating hand 35 or equivalent indicating mechanism.

As diagrammatically shown in Fig. 3, Bourdon tube 7 is provided with a baffle 8 secured to its sealed free end. This baffle overlies a stationary jet 9 which is supplied with air under constant pressure from any suitable source, transmitted from a supply pipe 10 and thence through a pipe 11 and a pressure reducing orifice 12, and thence through a pipe 13. Increase of internal pressure in Bourdon tube 7, due to increase of specimen load, causes expansion of the tube and accordingly moves baffle 8 upwardly. However, the most minute upward movement of the baffle 8 away from jet 9 will instantly cause a reduction of pressure in pipe 13. A bellows 14 is connected to pipe 13 by passage 20 so that the internal pressure of bellows 14 will be the same as in pipe 13, which preferably is of minimum volume. An air relay valve 20' is controlled by bellows 14. Thus, a reduction of pressure in pipe 13 will permit contraction of bellows 14, causing a pin 15 and a ball 16 supported thereby to lower and thereby increase the clearance between ball 16 and a ball seat 17. Air is thus admitted from pipe 10, through passages 18 and 19, to pipe 25 and servo-motor 26. Servo-motor 26 may be any suitable piston or diaphragm type mounted upon a stationary bracket. Admission of air to motor 26 causes its movable element 27 to move a yoke frame 28 or other suitable mechanical connection downwardly and thereby increase the downward force on the free end of the Bourdon tube as through a spring 29 connected to the yoke and tube. The downward force transmitted to the free end of Bourdon tube 7 causes baffle 8 to be moved downwardly in the direction of the jet orifice until the baffle again restricts the flow therefrom and thereby increases the pressure in pipe 13. This increases the pressure in bellows 14, expanding it, raising pin 15 and ball 16 toward its seat 17, thus restricting the flow of air from pipe 10 through passage 18 into passage 19. A clearance between a hole 21 and pin 15 provides a small continuous leakage for the escape of air from passage 19 to the atmosphere. Thus, when the flow of air from pipe 10, through passage 18, is restricted by action of ball 16, sufficient air will flow out of passage 19 through the leakage clearance to establish and maintain a balance between the forces tending to expand the tube and the downward force imposed by the servo-motor 26 on the free end of Bourdon tube 7 through yoke frame 28 and spring 29. The free end of the tube is thus restored to its initial position. Conversely when pressure in the Bourdon tube is reduced, spring 29 will move the free end of the tube and baffle 8 downwardly, thereby restricting flow of air through the jet 9 with consequent increase of pressure in pipe 13. This increase of pressure causes air relay valve 20' to discharge air from motor 26, thus reducing the restoring force on the free end of the Bourdon tube which thereupon expands and accordingly moves baffle 8 upwardly to permit a freer discharge of air through jet 9. Pressure in pipe 13 is thus reduced whereupon the air relay valve functions in the manner previously described to control and hold pressure in restoring motor 26 so that a balance is reached between the forces tending to expand the tube and the restoring force therefor. Hence the free end of the tube and its baffle will have moved only sufficiently to return to their original position. The strength of spring 29 is such that for a given restoring force the frame 28 will have considerable movement compared to the minute movement of the baffle. Preferably the stress-strain relation of this spring is a substantially straight line which can be most effectively obtained by using a pair of well-known double helical springs 30, although it will of course be understood that other types of springs may be adapted to the principles of my invention.

It is found in actual practice that the free end of the tube has only minute movement in response to increments of pressure change therein, and that upon the occurrence of such movement the tube is very effectively restored to its original position by the cooperative action of the tube, the air relay control and the servo-motor 26 and spring 29. Hence the free end of the tube has a substantially constant position throughout full increases and decreases of fluid pressure therein with the result that the tube has a substantially straight line relation between variations of pressure therein and the force necessary to hold the free end to virtual fixed position. The servo-motor 26 exerts this force through yoke frame 28 and spring 29. Spring 29 is preferably chosen to extend in highly accurate straight line relation to its load. Therefore, changes of internal pressure in the Bourdon tube 7 will produce corresponding substantially straight line movements of the end of spring 29 held by yoke frame 28. Spring 29 may, however, have a varying relation in which case the indicating dial would be calibrated to compensate for such variations. Instead of using a tension spring such as 29, a compression spring 29a (Fig. 4) may be employed for transmitting the restoring force to the free end of the tube. All other elements would be identical to those of Fig. 3.

Heretofore the free end of the Bourdon tube has been permitted to move progressively in response to progressive changes in pressure therein with the result that movement of the tube when multiplied through a linkage and gearing did not necessarily give a straight line relation with respect to variations of pressure therein. Another difficulty with these prior Bourdon tube arrangements was that the slightest amount of friction or retarding force imposed upon the free movement of the Bourdon tube caused irregular and uncertain operation thereof. In accordance with the principles of my invention, motor 26 develops an extraordinary amount of power and movement, in response to minute displacements of the Bourdon tube from its balanced position. As a result, motor 26 may operate indicating apparatus through wide ranges of movement, it being understood that the term indicating apparatus broadly refers to recorders as well as to direct reading devices such as a pointer and dial.

The amount of power available is shown by considering the forces of friction and of inertia of the indicating apparatus or other portions of the equipment. These forces under certain circumstances will be downward opposing upward motion of frame 28 and under other circumstances will be upward opposing downward motion of the frame. For purposes of illustration, these forces may be considered as simple external forces represented by adding a weight to or removing it from frame 28 while the pressure in the Bourdon tube remains unchanged. The theory of operation under these circumstances also explains more fully the restoring operation previously mentioned.

Assuming that the fluid in the Bourdon tube is not under pressure and that the jet is so adjusted in relation to the baffle that the air relay will cause the servo-motor to exert a downward load on the end of the tube through spring 29 in order to establish the normal balanced relation between the jet and baffle. This downward force will have caused the tube to bend mechanically as a cantilever, creating stresses in the walls thereof. This prestressing is independent of any fluid pressure force within the tube. Assuming that said downward force exerted by the servo-motor is three pounds, then the stresses in the walls of the tube will, of course, exert an equal and opposite reaction force of three pounds upward on the end of the tube. It will then be assumed that the fluid in the hydraulic weighing support 3 and Bourdon tube 7 will be preloaded by springs 5 of the testing machine and that this preloading pressure will give an upward force, of say two pounds, at the free end of the tube. The preloading of the fluid in the Bourdon tube will thus cause baffle 8 to rise, thus reducing pressure in the pipe 13 and thereby opening valve 20' to admit more pressure fluid to servo-motor 26 which will increase the downward force on the free end of the tube as through spring 29. This downward force will increase until baffle 8 is restored to its predetermined balanced relation with jet 9, thus reestablishing the full initial bending stresses in the tube. The load exerted by the servo-motor will now be a total of five pounds, three pounds to oppose the initial stresses in the walls of the tube and two pounds to oppose the upward force of the hydraulic pressure. This initial prestressing of the tube, whether it be brought about by the initial hydraulic preloading or by the mechanical bending above referred to, or both, is desirable to provide the tube with a force at all times opposing the force exerted by the spring 29, so that the position of the end of the tube with its baffle 8 is sensitive to the slightest variation of the force exerted by spring 29, and thus will control by the associated action of the jet and air relay, the servo-motor load for overcoming possible friction and to establish a positive position of yoke frame 28 at zero testing machine load. Now if a weight is applied to stem 34 (Fig. 3), representing a friction force acting downward and thus opposing upward motion of yoke frame 28, yoke frame 28 is moved down slightly as the force of the added weight is transmitted through spring 29, stretching said spring, which in turn applies its additional load to the end of the Bourdon tube. This causes the tube with its baffle 8 to move downwardly, restricting the jet discharge and also causing the tube walls to be further stressed by reason of the tube bending as a cantilever. The restriction of the jet discharge in cooperation with the air relay valve 20' immediately causes partial unloading of servo-motor 26, thereby decreasing the pull exerted by yoke frame 28 through spring 29 upon the end of the Bourdon tube. As said pull decreases, the spring 29 contracts, thereby raising yoke frame 28 toward its initial position. The downward force on the end of the Bourdon tube will also simultaneously decrease, the unbalanced bending stresses of the tube thereupon causing the end of the Bourdon tube and its baffle 8 to move upwardly toward its initial position. This action continues until baffle 8 and jet 9 regain their normal relation.

Actually when the weight is applied, a condition of unbalance is momentarily created, the servo-motor 26 unloading by an amount equal to the weight, with the result that the same total downward force exerted on the end of the Bourdon tube by spring 29 is the same as before the weight is applied. The amount of weight that can be added cannot exceed the amount by which the servo-motor can unload. As previously mentioned, the servo-motor force or load amounted to five pounds. Hence, so long as the weight is kept within this limit, it is seen that the servo-motor 26 may unload sufficiently to compensate for the additional weight and still permit the tube to exert an upward force sufficiently to restore the baffle to its initial position after it is moved downwardly toward the jet. The illustration considered was at zero range, i. e., no load on the specimen of the testing machine. When loads are placed on the specimen, the hydraulic pressure in the Bourdon tube increases accordingly, thus requiring the servo-motor to exert greater downward force to hold the end of the tube with the baffle to a balanced relation with the jet. Hence it is seen that the servo-motor with its increased downward force has automatically increased its capacity to unload and thus be able to compensate for more weight added to yoke frame 28 (downward frictional force) than at zero range. It follows that the capacity of the servo-motor to unload, and hence the ability to handle downward frictional forces, varies in proportion to increase of load on the specimen. As a second illustration, consider a frictional force acting upward opposing the downward motion of yoke frame 28, which can be represented by the removal from the yoke frame 28 of the weight considered in the first illustration. When the weight is removed, the yoke frame 28 moves up slightly due to the contraction of spring 29. The removal of the weight also simultaneously caused an unbalancing of forces in an upward direction, thus permitting the end of the tube with its baffle to move upwardly by reason of the stresses in the walls of the tube and the hydraulic pressure.

The freeing of the jet discharge actuates the air relay valve 20' which admits additional pressure to the servo-motor, increasing its push downward on yoke frame 28. As the push increases, yoke frame 28 moves down towards its initial position, stretching spring 29, and thereby pulling the end of the Bourdon tube with its baffle 8 downwardly until the baffle and jet regain their balanced relation, at which time yoke frame 28 is in its original position. Actually when the weight is removed, a condition of unbalance is momentarily created, the servo-motor 26 loading by an amount equal to the weight, with the result that the same total downward force exerted on the end of the Bourdon tube by spring 29 is the same as before the weight was removed from yoke frame 28. If the area of the servo-motor and the available air supply pressure is considerable, the servo-motor is capable of exerting very large loads while still retaining all desired qualities. The force required for the normal loading of the spring 29 for controlling the Bourdon tube baffle through the range of the device, is only a small portion of the force available, leaving large forces available to overcome friction or inertia.

In the first illustration given, where a weight was added to the yoke frame at zero testing machine load, the entire force exerted by the servo-motor was transmitted through spring 29 to the end of the Bourdon tube, a total of five pounds. As explained, the amount of weight that could be added to yoke frame 28 at zero load was thus limited to five pounds. The ability to withstand addition of weight can be substantially increased by the addition of a servo-motor initial load spring 29'' shown in Fig. 3, which has heretofore been omitted from the discussion for sake of clarity. This spring is adjusted so that it will at all times exert a substantial upward force against the action of the servo-motor. This requires a higher fluid pressure in the servo-motor in order to obtain the normal differential downward force for loading the end of the Bourdon tube as previously described. With a larger servo-motor fluid pressure at all times, the servo-motor is in a condition to unload more, and hence handle more friction or extrinsic forces acting in a direction opposing the upward motion of the yoke frame 28. A further advantage derived from use of spring 29'' is that the resultant high pressure existing at all times in servo-motor 26, will be more sensitive to action of the air relay valve, this by reason that the rate of discharge through the valve clearance will be very much greater than if the servo-motor pressure were initially low. Hence the rate of unloading can be made as rapid as the rate of loading which will result in decreased time lag between response of the servo-motor to action of the jet and baffle. Thus any frictional or operating forces in connection with the indicating apparatus will be overcome, without introduction of error, in accordance with the principles of the foregoing illustrations. Inasmuch as the baffle does not contact the jet, and there are no moving parts, contacts or bearings on the sensitive elements of the apparatus, it is seen that the sensitive elements are not subject to friction.

The principle of prestressing the tube wall would not apply in the case of pressure responsive elements of the type comprising rams, diaphragms or bellows because these devices do not have sufficient structural resistance to bending as in the case of the cantilever action of a Bourdon tube. Hence the hydraulic pressure would be the only force tending to raise the ram, etc. against the action of the servo-motor with the result that it would be impossible to obtain sensitivity and accuracy at or near zero pressure. Of course, if a suitable spring 161, Fig. 12, as will be more fully described hereafter, is arranged to bias a pressure responsive plunger 155 upwardly so as to permit a preloading force to be created by the servo-motor, then the above mentioned principle of prestressing the Bourdon tube may be considered to broadly apply.

Pressure responsive elements of the ram and bellows types exert an upward force equal to the fluid pressure therein multiplied by their area. This upward force would be so large with large capacity testing machines that it would be impracticable to use a servo-motor of the necessary power to provide the opposite downward restoring force. On the other hand, the Bourdon tube is particularly adapted for use in connection with materials testing machines because the Bourdon tube has the peculiar property of being able to withstand large internal fluid pressures and yet require only moderatedly small restoring forces necessary to hold the end of the tube to its initial position. Due to the ability of using only a small restoring force, it is possible to use a small straight line spring and a small servo-motor. It is not convenient to provide straight line springs and loading mechanism to handle large forces. In addition, there is the further advantage that the Bourdon tube is is inherently capable of withstanding an initial loading by the servo-motor even when there is no fluid pressure in the tube. The Bourdon tube can be given an initial prestressing load and thereby be responsive with a high degree of sensitivity and accuracy to pressure changes in the tube beginning at zero fluid pressure, and also be sensitive so as to control the servo-motor to overcome and eliminate the effects of frictional forces in the indicating mechanism.

*Indicating means.*—To operate load indicating hand 35, Fig. 1, it is only necessary to provide yoke frame 28 with a dependent rack 34 for engagement with a pinion 36 secured either to the pointer shaft or to a shaft 37 (Fig. 2) of a multiple load range mechanism. This mechanism includes a pinion 38 secured to a shaft 37 and meshing with a gear on a jackshaft 39 which is manually axially shiftable in any suitable manner. Merely as illustrative, an enlarged opening 39' in dial face 43 may permit the operator to have direct access to the outer end of shaft 39. Any usual form of detent device generally indicated at 39a may be employed to hold the shaft in its selected position. The jackshaft is provided with a series of reduction gears 40 adapted to be selectively meshed with any one of a series of gears 41 secured to a pointer shaft 42. Hence it is seen that for any one of different maximum loads the gearing just described may cause hand 35 to rotate for the full angular distance over the face of a dial 43. Thus for small maximum loads each dial graduation will represent a small increment of load, thus permitting the lower load ranges to be read with a high degree of accuracy. It will of course be understood that in accordance with prior art arrangements the dial face may be provided with different series of graduations corresponding to the various load ranges or the dial may be suitably constructed and arranged so as to permit one series of graduations to serve for all load ranges as is well known in the art. However, specific construction and arrangement of the dial does not form a part of my present invention and hence need not be described further.

The foregoing multiple load operation can be used without fear that the operating forces or friction will inject errors into the reading, the servo-motor having as previously explained sufficient power and movement to amply overcome such conditions. In fact, the servo-motor is capable of sufficient power to operate a recorder device in common with the load pointer. To accomplish operation of the recorder, as well as the load indicating hand, all from a common power source and common load responsive means, I have provided (Fig. 2) bevelled gears 44 secured respectively to the pointer shaft 42 and to a recorder shaft 45. This latter shaft supports (Fig. 1) a recorder drum 47 for rotation therewith. The shaft may be suitably journalled in bearings of a recorder frame 48. Thus the drum will be rotated in accordance with load to permit a stylus 51 to mark a record sheet thereon. Furthermore, the drum will be rotated through its full angular extent regardless of the load range selected. This is accomplished by virtue of having the recorder shaft 45 and gears 44 secured to the pointer shaft 42 rather than to the shaft 37 of Fig. 2.

To record strain, I have provided an improved strain responsive means embodying the air relay principle. An extensometer of any suitable frame construction, diagrammatically indicated at 53, is attached to a specimen 52 (Fig. 5) and has a strain responsive movable lever 54 formed preferably as a part of a pivoted bellcrank whose short leg constitutes a gauge point 55. The extensometer frame is provided with another gauge point 56. The gauge points are held in contact with the specimen through a clamp 57 and a spring pressed roller 58 as is usual in the art. A bellows 59 is suitably secured to a portion of the extensometer frame while an air jet 61 is carried by the movable side of the bellows and is arranged to direct its jet against the surface of strain responsive element 54. A spring 59' adds stiffness to the bellows, thus permitting the use of a light and flexible bellows so that practically all of the elastic properties of the combination are provided by the spring. This spring is preferably of the cantilever type having one end secured to the extensometer frame and the other end to the movable side of the bellows. While the bellows has a substantially straight line relation between increments of pressure and movement, yet this relation is more definitely obtained by the action of the cantilever spring. An air relay valve generally indicated at 62 is identical in construction and operation to that of valve 20' (Fig. 3), and hence it is unnecessary to again describe its structure or operation per se. Valve 62 may be supported (Fig. 1) on any suitable stationary portion of the testing machine separate from the jet and strain responsive mechanism, the air connections between the valve and bellows 59 being sufficiently flexible so as not to impose any undue force upon the strain responsive device. Such connections may be rubber tubes or metallic pipes with sufficient coils 62' to insure utmost flexibility. However, if desired, valve 62 may be supported upon the extensometer frame 53, thus not requiring flexible air tubing leading to the air valve.

In operation of the strain responsive control, upon an increase of strain in specimen 52, element 54 will swing outwardly away from air jet 61, thus allowing air pressure in a pipe 63 to drop and causing valve 62 to admit air from a suitable constant pressure source through a pipe 64 to pipes 65 and 66. As previously described, this admission of fluid to pipes 65 and 66 will vary the pressure therein in proportion to the movement of element 54. The increased pressure admitted to bellows 59 will cause axial expansion thereof so as to move jet 61 toward element 54 and thus again restrict discharge from the jet with the result that pressure will build up in pipe 63 and cause valve 62 to shut off flow of air from supply pipe 64 to pipes 65 and 66. Conversely when the strain decreases, arm 54 is moved toward jet 61 to restrict discharge therefrom and thus build up pressure in pipe 63 and cause fluid to be discharged from pipes 65 and 66 with the result that bellows 59 will contact and thus move jet 61 away from element 54 so as to decrease pressure in pipe 63 to shut off discharge from pipes 65 and 66. It is thus seen that bellows 59 functions as a restoring device for maintaining a predetermined substantially constant relation between strain responsive element 54 and 61. As previously described, these elements are extremely sensitive in their cooperative action, and hence very minute movement of the strain responsive element will be immediately reflected in a relatively large pressure change in pipe 65. The pressure in pipe 65 is transmitted to a Bourdon tube 68. Associated therewith is an air relay control and servo-motor arrangement identical in every respect to the Bourdon tube 7 and its control elements. Hence it will suffice to only briefly and generally point out a baffle and jet 69, air relay valve 70, servo-motor 71, yoke frame 72, spring 73 and a dependent rack 74. A pinion 75, driven by said rack, operates a pulley and string arrangement 76 which shifts stylus 51 longitudinally along a guide rod 77 and axially of drum 47.

From the foregoing disclosure it is seen that I have provided an extremely sensitive and yet highly accurate and smoothly operating stress-strain recording apparatus having a high power multiplication with minimum possibility of any adverse influence from friction or excessive operating forces.

*Load maintainer.*—The Bourdon tube 7, Fig. 1, and its associated servo-motor and spring frame are so arranged as to be adapted not only to indicate load by the pointer and dial but also to function as a load responsive element of a load maintainer apparatus whereby load on the specimen may be maintained at any selected value. As shown in Fig. 1, rack 34 is provided with an extension 78 carrying a baffle 79 at its lower end.

This baffle overlies an air jet 80 connected by a pipe 81 to a bellows 82 which operates an air relay valve 83, all in the manner as described for Fig. 3. Hence further detailed description is not necessary. The pressure in pipe 81 varies in accordance with the relative position of the baffle 79 to the jet 80, thereby operating relay valve 83 and admitting or discharging air to a pipe 84 which is connected to a suitable servo-motor specifically shown in the form of a diaphragm 85 which operates mechanism for controlling the rate of supply of loading fluid to cylinder 1. Such mechanism is specifically shown herein for purposes of illustration in the form of a valve 86 located in a discharge line 87 of the load producing fluid pump 2. As shown in Fig. 7, jet 80 is preferably mounted upon an axially yieldable plunger 88 normally urged upwardly by a spring 89 against a suitable shoulder of a sleeve 90. This sleeve is suitably threaded in a stationary bracket 91 for axial adjustment of the jet. To determine the jet position and therefore determine the load to be applied to a specimen, a disc 92 having preferably a bevelled periphery is secured to sleeve 90 to register against a suitably graduated stationary member 93. The graduations on this member will correspond to certain given loads on the specimen.

In operation of the load maintainer, the operator adjusts sleeve 90 to some predetermined axial position in accordance with the graduations on member 93. Load will then be applied to the specimen, whereupon Bourdon tube 7 and its associated jet relay and servo-motor will respond to cause rack rod 34 to move downwardly. When the load has reached the predetermined value, baffle 79 will restrict discharge from jet 80 and cause pressure to be built up in pipe 81 and be reduced in 84 whereupon servo-motor 85 and valve 86 are moved upwardly by a suitable spring to discontinue flow of liquid from pump 2 to the load producing cylinder 1, thereby to maintain a constant load on the specimen. The valve 86 and servo-motor 85 are so proportioned that the valve is closed when baffle 79 and jet 80 are in their predetermined neutral relation, it being understood that servo-motor 85 is constantly urged in a closing direction by a suitable spring and moved to open position by admission of fluid pressure of the servo-motor. If the load on the specimen should tend to decrease due to leakage around the load producing ram, then the weighing pressure in Bourdon tube 7 will likewise decrease, thus causing baffle 79 to rise, reducing the restriction on jet 80 and thus permitting an increase of pressure in pipe 84 with consequent opening of valve 86 to restore load on the specimen to a point where the baffle 79 and jet 80 are returned to their predetermined relation. Thus it is seen that I have provided an extremely simple and highly effective means adapted for cooperation with the load indicating system for maintaining a predetermined load on a specimen in accordance with any readily selected value as determined by the adjustment of sleeve 90. In case the specimen load should for any reason momentarily pass beyond the desired constant load, then rack rod 34 and baffle 79 would be moved downwardly into direct contact with the jet 80. However, no damage will occur because jet 80 is yieldingly supported by spring 89. Inasmuch as the pump discharge valve 86 will be completely closed under these circumstances, it is seen that subsequent inherent leakage in the testing machine will permit reduction of specimen load until baffle 79 is returned upwardly to its normal relation with respect to jet 80.

Figure 6:
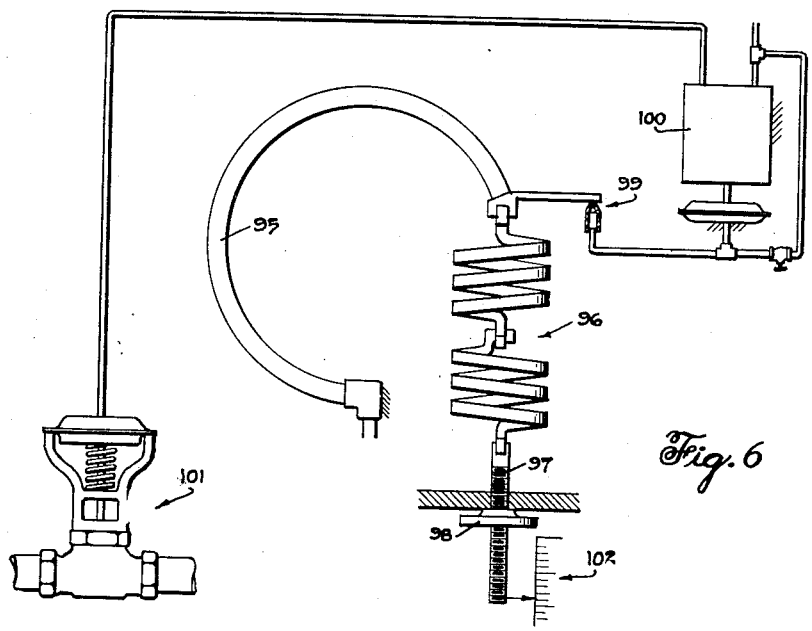
Fig. 6 is an enlarged diagrammatic illustration of a load maintainer, the principle of which is embodied in Fig. 1.

The principles of the load maintaining system above described can be utilized in an independent load maintaining apparatus if so desired. Such an arrangement is shown in Fig. 6, wherein a load responsive Bourdon tube 95 is provided separate from the Bourdon tube 7. A spring 96 preferably of the straight line form previously described is secured at one end to the free end of the Bourdon tube and at its other end to an axially adjustable threaded rod 97. A nut 98 threaded on rod 97 engages the under side of a suitable stationary bracket. A baffle and jet arrangement 99 is adapted to control an air relay valve 100 which in turn controls a servo-motor operated pump discharge valve 101. This valve may be disposed in the discharge line of the load producing pump 2 or in the line of any type of system to which my invention may be broadly applicable. The operator will adjust nut 98 until a pointer on rod 97 indicates a selected load value on a graduated member 102. This adjustment will cause spring 96 to pull the baffle and jet into contact, thus causing relay valve 100 to discharge fluid from servo-motor 101 to permit complete opening of the valve controlled thereby. As fluid pressure builds up in tube 95 due to increasing load on the specimen, in the case of a materials testing machine, then when this load reaches the point where it will overcome the tension of spring 96, the baffle will uncover the jet and cause valve 100 to admit pressure fluid to the servo-motor 101 to cause closure of its valve and prevent further increase of load on the specimen. Upon occurrence of leakage around the load producing ram or at other possible sources, the specimen load would drop thereby permitting Bourdon tube 95 to cause the baffle to restrict the jet and thus reduce the closing pressure in servo-motor 101 with the result that its spring will open the valve and permit further loading of the specimen.

Thus it is seen that servo-motors 85 and 101 and the pump discharge valves associated therewith function to determine the pressure in their respective Bourdon tubes 7 and 95 in order to effect restoration of the normal relation between their baffles and jets. Hence it is more clearly seen in Fig. 6 that the external force of spring 96 remains substantially constant while the pressure in the tube varies to maintain its free end in a normal or neutral position.

*Fig. 9 modification.*—The principle of maintaining a substantially fixed position for the free end of the Bourdon tube of Fig. 3 may be accomplished by the modified arrangement shown in Fig. 9. A source of current as diagrammatically indicated by a battery 124 supplies a circuit including a stationary portion of the Bourdon tube, a solenoid 125, a contact 126 and a cooperating contact 127 on the free end of the tube. A spring 128 urges clockwise rotation of a pivoted frame carrying a pair of bevel gears 129 and the solenoid 125 effects counterclockwise rotation. A motor driven gear 130, coaxial to the axis of oscillation of the pivoted frame, continuously drives gears 129. As the fluid pressure in the Bourdon tube increases, contact 126 is closed thereby causing solenoid 125 to be energized and throw one of gears 129 out of, and the other into, mesh with a gear 131 to effect rotation of a nut 132. This nut thus moves its screw shaft 132' downwardly to increase the tension on a spring 133 to open the contacts. Instantly spring 128 will reverse the meshing of gears 129 and 131 to reverse the nut and reduce the tension on spring 133 to reestablish the contacts 126. The above action will continue, but predominately in one direction or the other depending upon whether the fluid pressure in the tube is increasing or decreasing. Shaft 132' corresponds to rack rod 34 of Fig. 1 so that the remaining elements operated thereby may be considered as also being operated by shaft 132'.

*Fig. 10 modification.*—A still further modification embodying my improved Bourdon tube operation is to utilize an armature 135 (Fig. 10) secured to the free end of the Bourdon tube and disposed in the opposed fields of coils 136 and 137. These coils are part of a Wheatstone bridge energized from a source of alternating current through wires 138. Formed as a part of the bridge connections and respectively connected to coils 136 and 137 are coils 139 and 140 between which an armature 141 is pivotally or otherwise supported so as to make or break one or the other of contacts 142 and 143. These contacts respectively control circuits for solenoids 144 and 145. An armature 146 is normally biased by springs 147 to a neutral position between solenoids 144 and 145. Gears 148 continuously driven in the same manner as gears 129 of Fig. 9 are mounted for oscillation by armature 146 into alternative engagement with a ring gear 149. However, gears 148 are adapted to be simultaneously out of engagement with gear 149 which is in distinction to the Fig. 9 form where one or the other of gears 129 are in engagement with gear 131. In operation, it will be seen that upon variations of pressure in tube 7, armature 135 will be moved either upwardly or downwardly to unbalance the Wheatstone bridge and accordingly cause one or the other of coils 139 and 140 to be energized, thereby pulling armature 141 either to the left or right so as to close the circuit for either solenoid 144 or 145. Upon energization of coil 144 or 145, the nut 150 will be rotated in one direction or the other to cause threaded stem 151 to either increase or decrease the tension of spring 152, thereby to return the free end of the Bourdon tube and its armature 135 to their initial position. When this occurs, then the coils 139 and 140 will be in balance and armature 141 will open both contacts 142 and 143. The devices of Figs. 9 and 10 will have all of the characteristics and mode of operation of the Fig. 1 form.

*Fig. 11 modification.*—In this modification I have shown the pressure responsive element in the form of a small ram 155 and a stationary cylinder 156, preferably lapped. The upper end of the ram is provided with a baffle 157 for cooperation with an air jet 158. A spring 159 is connected at one end to a servo-motor restoring frame 160 and is secured at its other end to a suitable yoke frame 160' encircling the ram for attachment to its upper end. A reaction spring 161 is provided beneath plunger 155 to permit a preloading force to be created by the restoring servo-motor. The spring 161 is of such strength to provide a substantially constant reactive force of say three pounds within the limits of movement of baffle 157. This preloading corresponds to the mechanical pre-stressing of the Bourdon tube, and hence they may both be broadly referred to as pre-stressed load responsive means, it being understood that this pre-stressing is for the purpose of making the plunger 155, with its baffle 157, sensitive to the slightest variations of force exerted by spring 159, even when there is no fluid pressure acting under plunger 155. Weighing fluid pressure, whether taken directly from the main ram and cylinder 1 or from an independent hydraulic support, is admitted to cylinder 156 to operate pressure responsive plunger 155 in the same manner as in the operation of Bourdon tube 7. The servo-motor, air relay valve and indicating mechanism are omitted from Fig. 11 for purposes of clarity and simplicity inasmuch as such elements would be identical to those disclosed in Fig. 1.

Figure 8:
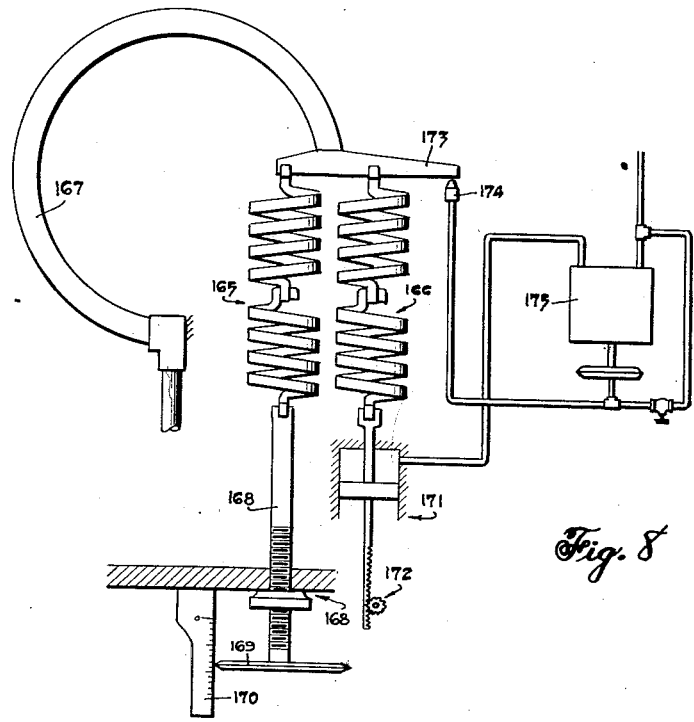
Fig. 8 is a modification embodying the principles of my invention and arranged to give sensitive and open scale readings of pressure for small increments of pressure at any portion of the entire pressure range of the apparatus.
Figure 8A:
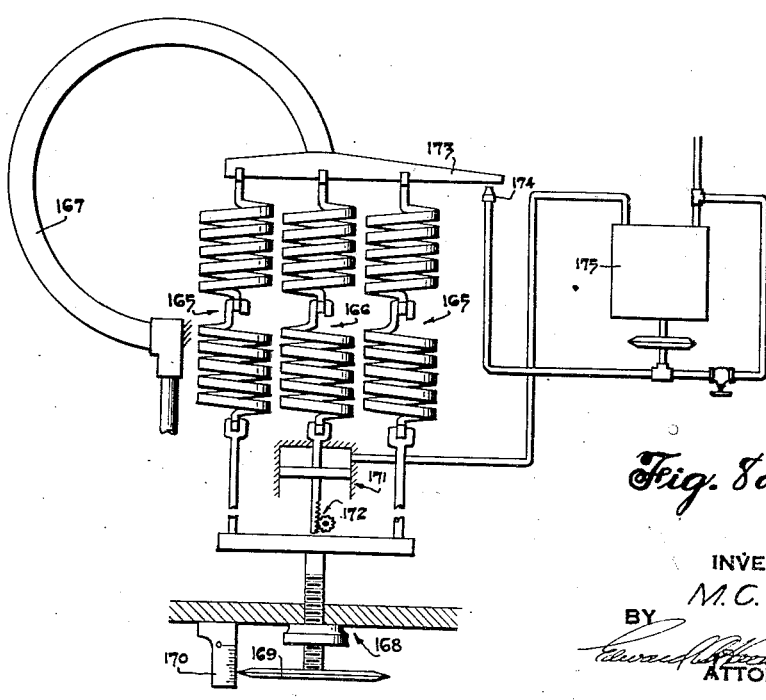
Fig. 8a illustrates the manner of avoiding eccentric spring forces on the end of the Bourdon tube in the arrangement of Fig. 8.

*Fig. 8 modification.*—In order to measure with accuracy, sensitivity and open scale readings small increments of pressure above some predetermined load to which the tube is subjected, I have provided two sets of straight line springs 165 and 166 each connected to the free end of a Bourdon tube 167. The tension of spring 165 is manually adjusted by a suitable nut and threaded rod generally indicated at 168, the rod being provided with a pointer 169 opposite a graduated scale 170. Spring 166 is connected to a restoring servo-motor 171 which operates a rack and pinion generally indicated at 172 of any suitable indicating mechanism. A baffle 173 overlies an air jet 174 which controls an air relay valve 175. All of these elements have been described in other modifications. To avoid any eccentric spring forces on the end of the Bourdon tube, there may be provided two main springs 165 (Fig. 8a) connected symmetrically to the tube and to rod 168 while the single automatic spring 166 is placed between the main springs and connected directly to the free end of the tube in alignment therewith.

In operation, at zero range, the relatively stiff manually adjustable spring 165 is first set so that its pointer 169 indicates zero on scale 170. Then the spring 166 with its air relay system and servo-motor 171 are allowed to come to a state of balance, and the pointer (or the position of the scale relative to the pointer) of automatic spring unit 166 indicating mechanism is adjusted to read zero scale. Now assume that a substantial pressure is applied to the Bourdon tube, which can be called the base pressure, above which it is desired to accurately read small increments of pressure. The automatic spring unit 166 will try to balance the new pressure, but the manually adjustable spring 165 is now tightened until the automatic spring unit indicating pointer returns to its zero scale, showing that manual spring 165 has assumed the tension for the entire base pressure, which is then read at pointer 169 on scale 170. Assuming that further load is added, above base load, then the automatic spring unit 166 and associated servo-motor 171 and other parts will function to maintain the normal baffle-jet relationship. This, however, will cause operation of the indicating mechanism through the rack and pinion 172, thus giving accurate and sensitive open scale readings of small increments of pressure above the base load. While this apparatus is applicable to materials testing machines, it is also applicable to any equipment where large tare loads are encountered.

Figure 12:
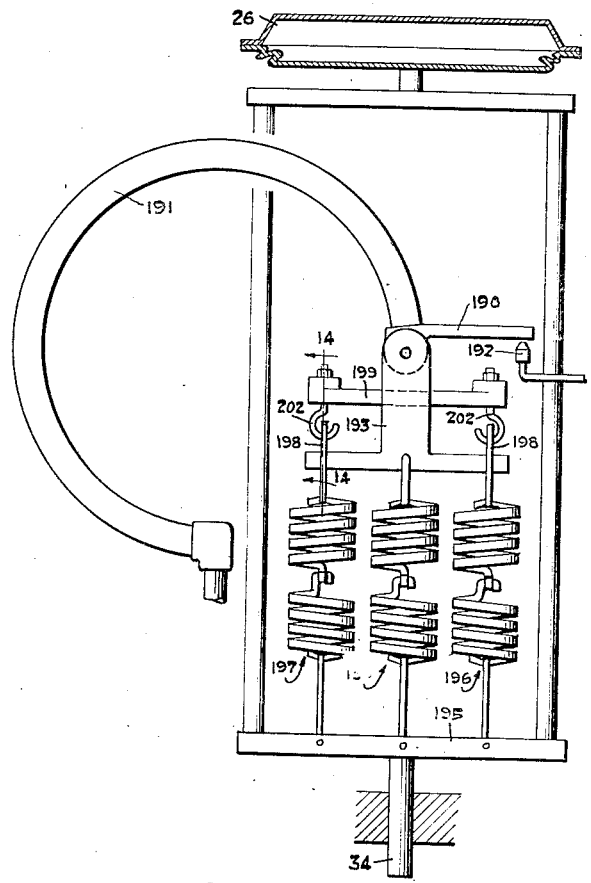
Fig. 12 is an improved arrangement for changing springs to vary the load range of the apparatus.
Figure 13:
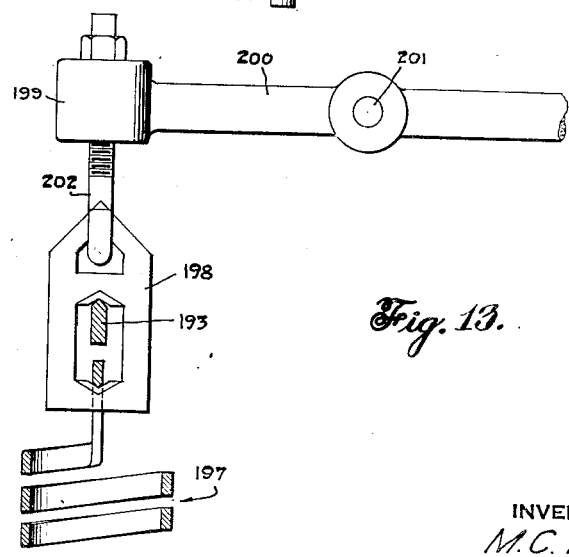
Fig. 13 is an enlarged sectional view taken on the line 14—14 of Fig. 12.

*Fig. 12 modification.*—In any of the arrangements shown, e. g., Fig. 1 and others, if it is desired to reduce or enlarge the extent of movement of the servo-motor and its yoke frame for a given increment of load change in the Bourdon tube, whereby full scale movement is obtained for different maximum loads, then it is only necessary to substitute a spring 29, Fig. 3, of different capacity. This may be done by bodily removing the spring and inserting another one, or if desired the spring capacity may be changed by my following improved semi-automatic change-over apparatus. As shown in Fig. 12, a jet baffle 190 is fixed to the sealed end of a Bourdon tube 191 for cooperation with a jet 192. Inasmuch as the remaining air relay valve control and servo-motor operation is identical to the various forms heretofore described, it is not necessary to again describe the same here. A T-piece 193 is pivotally supported on the free end of the tube. A straight line spring generally indicated at 194 is permanently connected to the T-piece on its vertical center line while the lower end of said spring is also permanently connected to the lower crosshead 195 of the servo-motor yoke frame. A pair of straight line springs 196 and 197 are also permanently connected at their lower ends to crosshead 195 while their upper ends are each provided, Fig. 13, with a yoke 198 which rests on the horizontal portion of the T-member 193. The three springs are simultaneously operative in the position as shown and hence the force for resisting movement of the Bourdon tube is equal to the sum of the forces exerted by the three springs. This will permit a limited movement of the servo-motor and its yoke frame for a given increment of pressure change in the Bourdon tube. Briefly this represents one of the load ranges.

To provide another load range, the outer springs 196 and 197 which are duplicates in every way, have their yokes 198 lifted from contact with the T-piece 193, thereby permitting spring 194 to constitute the sole resisting force. Hence for a given increment of load change, the servo-motor and yoke frame will move a greater distance in order to effect the necessary restoring force on the Bourdon tube than would be the case were all three springs employed. This increased movement permits the indicating hand or other indicating apparatus to move over a larger portion of the scale than would be possible for all three springs. Spring 194 is designed to be, say ten times as flexible as springs 194, 196 and 197 combined, thus giving load range change of ten to one. To lift the outer springs 196 and 197, I have provided a shift frame 199 adapted to be moved vertically in any suitable manner such as by a lever 200 provided with a suitable stationary pivot 201. This frame has a pair of depending hooks 202 normally loosely disposed in suitable openings in the yokes 198 but not touching the same. In operation, it is only necessary to raise shift frame 199 so as to lift yokes 198 upwardly to free T-frame 193 of the downward force exerted by springs 196 and 197. This will give one of the desired load ranges. To provide the other load range it is only necessary to lower the shift frame 199 to permit the yokes 198 to again rest on the T-frame. The lever 200 may be suitably latched or otherwise held in its down position when the springs 196 and 197 are lifted.

During the foregoing operation of the lower load range, i. e., when spring 194 is acting alone on the Bourdon tube, the lower ends of springs 196 and 197 remain permanently in engagement with crosshead 195. These outer springs will thus maintain an upward force on the servo-motor frame, but the fluid pressure in the servo-motor will fully resist this force by reason of the fact that the servo-motor pressure will have been originally sufficient to operate against the force of the three springs when acting together. When the outer springs 196 and 197 are thus lifted from the T-frame, these outer springs function somewhat in the nature of preloading springs for the servo-motor. The force of these springs is however removed from the T-frame 193, and hence the movement of the Bourdon tube is resisted only by the central spring 194. It is the resisting force on the T-frame which is the controlling factor in determining the extent of movement of the servo-motor and its yoke frame for a given increment of load change in the Bourdon tube. Hence it is seen that I have provided an extremely simple and yet highly effective means for effecting a change in load range in an expeditious manner while still maintaining the high degree of accuracy and sensitivity of the apparatus. The stem 34 in Fig. 12 is connected to a rack and pinion operated pointer as described in connection with Fig. 1.

From the foregoing disclosure of the several modifications, it is seen that the various desirable results of my improved arrangements are accomplished with accuracy and sensitivity combined with high power magnification and smooth operation free from adverse influences of friction or extrinsic forces.

It will of course be understood that various changes in details of construction and arrangement of parts may be made by those skilled in the art without departing from the spirit of the invention as set forth in the appended claims.

I claim:

1. In combination, a Bourdon tube, means for prestressing the same, means responsive to movement of the free end of said tube away from a given position, and means controlled by said responsive means for effecting restoration of the free end of the tube substantially to said position.

2. In combination, a Bourdon tube having a free end adapted for incremental movement away from a given position when the tube is subjected to a pressure change, an extensible member connected to said free end, a fluid operated motor connected to said extensible member for transmitting force therethrough to said free end, passages for supplying pressure fluid to said motor for continuously biasing the same by fluid pressure in a direction to resist expanding movement of said tube when subjected to fluid pressure, means for controlling the pressure fluid of said motor so as to restore the free end of said tube substantially to said given position upon movement therefrom resulting from a pressure variation in said tube, said extensible member allowing said motor to have a large increment of movement for each small increment of movement of the free end of the tube, and mechanism operated by and having the large incremental movement of said motor.

3. In combination, a Bourdon tube, means for prestressing the same, mechanism for imposing a variable force on the free end of said tube to oppose movement thereof caused by increases of pressure in the tube, and indicating means operated by said mechanism.

4. In combination, a Bourdon tube adapted to have an incremental movement away from a given position when the tube is subjected to a pressure change, means for prestressing said tube, power means for opposing movement of the free end of the tube in accordance with pressure variations therein, yieldable means interposed between said power means and the free end of said tube, means for controlling said power means automatically in response to a pressure change in the tube so as to maintain the free end of said tube in a substantially constant position whereby said yieldable means is progressively elongated for successive increments of pressure change, and mechanism operated by said power means.

5. In combination, a Bourdon tube adapted to have an incremental movement away from a given position when the tube is subjected to a pressure change, yieldable means operatively connected to the free end of said tube, a fluid operated motor continuously biased by fluid pressure for stressing said yieldable means to resist movement of said free end, means responsive to initial movement of the free end of the tube from a substantially predetermined position for controlling supply of power to said motor whereby said motor imposes sufficient force on the free end of said tube to return it substantially to said predetermined position, said yieldable means allowing said rotor to have a large increment of movement for each increment of movement of the free end of the tube, and means operated by and having the large movement of said motor.

6. In combination, a Bourdon tube, means for prestressing the same, yieldable means operatively connected to the free end of said tube, a motor for stressing said yieldable means to resist movement of said free end, means responsive to initial movement of the free end of the tube from a substantially predetermined position for controlling supply of power to said motor whereby said motor imposes sufficient force on the free end of said tube to return it substantially to said predetermined position, and mechanism directly operated by said motor.

7. In combination, a Bourdon tube having a baffle on its free end, power operated mechanism for imposing a force on said free end to oppose movement thereof caused by pressure changes in the tube, and means provided with an air jet cooperating with said baffle for controlling said power mechanism.

8. In combination, a Bourdon tube having a baffle on its free end, spring means having a substantially straight line stress-strain relation operatively connected at one end to said free end, an air operated servo-motor operatively connected to the other end of said spring means, and means for controlling air pressure in said servo-motor including an air jet over which said baffle lies to control discharge of air therefrom in response to minute movements of the free end of the tube on either side of a substantially predetermined position whereby variable fluid pressure forces within the tube tending to expand or contract the same are balanced by a corresponding variable force generated by said motor.

9. In combination, a Bourdon tube responsive to load applied to a specimen, means for prestressing said Bourdon tube, mechanism for maintaining the free end of said tube in a substantially constant position throughout load changes, a load indicating hand controlled by said mechanism, and a load recorder element also operated by said mechanism.

10. In combination; relatively movable stress-strain recorder elements; means for operating one of said elements in accordance with load applied to a specimen including a Bourdon tube, power operated mechanism for maintaining the free end of said tube in a substantially constant position and means for operating the stress element of said recorder by said power mechanism; means responsive to strain of a specimen; an air jet controlled thereby; and means controlled by said jet for operating the strain element of said recorder.

11. In combination, a plurality of recorder elements relatively movable in response to stress and strain of a specimen, means for effecting movement of said stress element including an air control mechanism having a Bourdon tube controlled air jet, and means responsive to strain of a specimen for operating the strain element of the recorder including an air control mechanism having an air jet controlled by said strain responsive element.

12. In combination, an extensometer frame adapted for attachment to a specimen, an element movable in response to strain of the specimen, an air jet associated with said frame and over which said strain responsive element lies to act as a baffle for the jet, fluid operated means for moving said jet relative to said baffle, means whereby said fluid operated means is controlled by said air jet and baffle so that said fluid operated means is moved to maintain the jet in a predetermined relation with said strain responsive element automatically in accordance with movement thereof, end strain indicating mechanism controlled by the pressure in said fluid operated means.

13. In combination, an element movable in response to strain of a specimen, air control means having an air jet adapted for cooperation with said strain responsive element for controlling the air control means automatically in accordance with movement of said strain element, and air operated means for restoring said air jet to a predetermined relation with said strain element automatically in response to movement thereof.

14. In combination, an element movable in response to strain of a specimen, air control means having an air jet adapted for cooperation with said strain responsive element for controlling the air control means automatically in accordance with movement of said strain element, and an air operated bellows having a movable portion carrying said jet, and means for supplying air pressure to said bellows to maintain said jet in a predetermined relation to said strain element automatically in accordance with movement thereof.

15. In combination, a frame having means engageable with a specimen to determine the gauge length thereof including a strain responsive element, an air jet supported by said frame and adapted for cooperation with said strain element, restoring mechanism also carried by said frame for maintaining a predetermined relation between said jet and strain element, and an air relay valve controlled by said jet.

16. In combination, a frame having means engageable with a specimen to determine the gauge length thereof including a strain responsive element, an air jet supported by said frame and adapted for cooperation with said strain element, restoring mechanism also carried by said frame for maintaining a predetermined relation between said jet and strain element, an air relay valve controlled by said jet, strain indicating mechanism controlled by said air relay valve, and means whereby said restoring means is controlled in cooperation with said indicating mechanism.

17. In combination, a Bourdon tube responsive to load on a specimen stressed in a materials testing machine, power mechanism for maintaining the free end of said tube in a substantially constant position throughout operation of the tube, multi-load range indicating means in which each load range is operative from a substantially zero position, and means whereby said power mechanism operates said indicating means for all of said load ranges.

18. In combination, a Bourdon tube responsive to load on a specimen stressed in a materials testing machine, power mechanism for maintaining the free end of said tube in a substantially constant position throughout operation of the tube, multi-load range indicating means in which each load range is operative from a substantially zero position, means for selectively rendering any one of said load ranges operative, and means whereby said power mechanism operates said indicating means for each of its load ranges.

19. In combination, a movable force responsive member continuously biased in one direction when subjected to force, a motor continuously under control of fluid pressure so as to be moved in a direction opposing the biasing force of said responsive member, extensible means operatively connecting said motor to said responsive member and having relatively large movement for each increment of applied motor force, means for controlling the pressure fluid power medium of said motor by said responsive member so as to maintain said responsive member in a substantially constant position throughout variations in force to which said member is subjected, and means connected to and moved by said motor a substantial distance for each increment of motor force that is required to maintain said responsive member in said substantially constant position.

20. In combination, a materials testing machine having a hydraulic load producing ram and cylinder, a pump for supplying load producing fluid to said cylinder, mechanism for controlling the rate of discharge of fluid from said pump to said cylinder, a pressure operated load responsive element, an air jet and baffle controlled by said responsive element, and means controlled by said jet and baffle for operating said control mechanism in accordance with movement of said responsive element away from a given position, thereby to control the loading pressure to said cylinder and accordingly control the operation of said responsive element.

21. In combination, a pressure responsive element, a baffle and air jet, means for resisting movement of said pressure responsive element and for controlling the relation between said baffle and jet upon occurrence of pressure changes in said pressure responsive element, and means controlled by said air jet and baffle for maintaining a predetermined pressure in said element.

22. In combination, a pre-stressed pressure responsive movable member mechanism for resisting movement of said responsive member when the same is subjected to pressure, and means for controlling said mechanism so as to maintain said member in a substantially constant position throughout variations in pressure to which said member is subjected.

23. In combination, apparatus having a source of pressure proportional to a load to be weighed, a pressure responsive member movable in accordance with the pressure from said source and pre-stressed independently thereof, mechanism for resisting movement of said responsive member when subjected to pressure from said source, and means for controlling said mechanism so as to maintain said member in a substantially constant position throughout variations in pressure to which said member is subjected.

24. In combination, a pressure responsive element, means for maintaining said pressure responsive element in a substantially constant position during changes of pressure therein including a power mechanism and a plurality of springs interposed between said power mechanism and pressure responsive element whereby for a given increment of pressure change said springs permit the power mechanism to have a relatively large incremental movement, and means for rendering certain of said springs inactive or for rendering said springs simultaneously active in resisting movement of said pressure responsive element thereby effecting different load ranges.

25. In combination, a load responsive member, a plurality of springs of different flexibility each connected to said responsive member, means for setting certain of said springs for a predetermined base load, mechanism controlled in accordance with movement of said responsive member for variably controlling the force of another of said springs in accordance with the load to be measured above said base load, and load indicating means operate by said mechanism.

26. In combination, a Bourdon tube prestressed so that even when it is normally inactive the free end of the tube is biased away from a normally neutral position, an extensible member connected to said free end and prestressed to resist movement thereof away from said position, means responsive to movement of said free end upon change of pressure in said tube, and means controlled by said responsive means for effecting restoration of the free end of the tube to substantially said position, whereby sensitivity of the tube is obtained at substantially no load and low loads.

27. In combination, apparatus having a source of pressure proportional to a load to be weighed, a pressure responsive element normally movable from a substantially given position in response to changes in the weighing pressure, extensible yieldable means connected to said responsive element, a fluid operated motor for transmitting force through said extensible means to restore said pressure responsive element substantially to its given position when the latter moves therefrom in response to changes in fluid pressure, means controlled by said pressure responsive element for controlling the fluid pressure of said motor thereby to effect said restoring action, and other yieldable means for initially resisting movement of aid motor so as to require the same to be subjected to a sensitizing initial pressure.

28. In combination, apparatus having a source of pressure proportional to a load to be weighed, a pressure responsive element normally movable from a substantially given position in response to changes in the weighing pressure, extensible yieldable means connected to said responsive element, a fluid operated motor for transmitting force through said extensible means to restore said pressure responsive element substantially to its given position when the latter moves therefrom in response to changes in fluid pressure, means controlled by said pressure responsive element for controlling the fluid pressure of said motor thereby to effect said restoring action, and means controlled by said motor for maintaining a predetermined pressure in said pressure responsive element.

29. In combination, an element movable in response to strain of a specimen, an air jet and baffle operatively associated with said strain responsive element so that the air jet pressure is controlled automatically in accordance with movement of said strain element, and air operated means controlled by said air jet and baffle for restoring said air jet and baffle to a predetermined relation automatically in response to movement of the strain responsive element.

30. In combination, a pressure responsive member, a fluid pressure operated power mechanism for resisting movement of said responsive member when the same is subjected to pressure, and means for controlling said power mechanism so as to maintain said member in a substantially predetermined position throughout variations in pressure in which said member is subjected including an air jet and a baffle therefor operatively associated with said pressure responsive member.

31. In combination, a pressure responsive member, a fluid pressure operated power mechanism for resisting movement of said responsive member when the same is subjected to pressure, an air jet and a baffle therefor operatively associated with said pressure responsive member whereby the air jet pressure varies in accordance with incremental movement of said pressure responsive member, an air supply pipe leading to said air jet and having an orifice through which air flows to said jet, and means connected to said air supply pipe at a point between said orifice and air jet for controlling operation of said power mechanism in accordance with variations in the air jet pressure.

32. In combination, a movable force responsive member continuously biased in one direction under the influence of a force, a fluid controlled motor continuously biased in a direction opposing the biasing force of said responsive member, extensible means operatively connecting said motor to said responsive member and having relatively large movement for each increment of applied motor force, means including an air jet and baffle for controlling the pressure fluid medium of said motor by said responsive member so as to maintain said jet and baffle in a substantially constant relation to each other throughout variations in force to which said member is subjected, and means connected to and moved a substantial distance by said motor for each increment of motor force that is required to maintain said air jet and baffle in said substantially constant relation.

33. In combination, a pressure responsive member continuously biased in one direction when under the influence of pressure to be weighed, a continuously biased fluid controlled servo-motor, cooperating air jet and baffle elements for controlling the pressure fluid of said motor and normally having a substantially predetermined relation, one of said elements being movable by said responsive member relative to the other element upon occurrence of a pressure change in said pressure responsive member thereby to control the operating force of said servo-motor in accordance with the pressure being weighed, means whereby said servo-motor effects relative movement between said jet and baffle elements so as to restore the same substantially to their predetermined relation after a pressure change occurs in said pressure responsive member, and mechanism operated by said servo-motor.

MALCOLM C. TATE.

CERTIFICATE OF CORRECTION.

Patent No. 2,212,085. August 20, 1940.

MALCOLM C. TATE.

It is hereby certified that error appears in the printed specification of the above numbered patent requiring correction as follows: Page 5, second column, line 36, for the word "contact" read --contract--; page 9, first column, line 18, claim 5, for "rotor" read --motor--; and second column, line 23, claim 12, for "end" read --and--; page 10, second column, line 22, claim 25, for "operate" read --operated--; line 51, claim 27, for "aid" read --said--; page 11, first column, line 12, claim 30, for "pressure in" read --pressure to--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.